(12) United States Patent
Goldstein

(10) Patent No.: US 9,305,714 B2
(45) Date of Patent: Apr. 5, 2016

(54) SOLAR CELL DEVICE

(71) Applicant: 3GSOLAR PHOTOVOLTAICS LTD., Jerusalem (IL)

(72) Inventor: Jonathan Goldstein, Il (IL)

(73) Assignee: 3GSOLAR PHOTOVALTAICS LTD., Har Hotzvim Industrial Park, Jerusalem ( * ) Notice: Subject to any disclaimer, the term of this patent is extended or adjusted under 35 U.S.C. 154(b) by 0 days.

(21) Appl. No.: 14/658,661

(22) Filed: Mar. 16, 2015

(65) Prior Publication Data

US 2015/0287542 A1    Oct. 8, 2015

Related U.S. Application Data

(63) Continuation of application No. 14/082,460, filed on Nov. 18, 2013, now Pat. No. 8,981,206, which is a continuation of application No. 12/814,523, filed on Jun. 14, 2010, now Pat. No. 8,586,861, which is a (Continued)

(30) Foreign Application Priority Data

Jan. 12, 2003  (IL) .......................................... 153895

(51) Int. Cl.
*H01G 9/20*          (2006.01)

(52) U.S. Cl.
CPC ........... *H01G 9/2031* (2013.01); *H01G 9/2068* (2013.01); *Y02E 10/542* (2013.01)

(58) Field of Classification Search
CPC .............. H01L 31/048; H01L 31/0485; H01L 31/0488
USPC .................................. 136/251, 252, 256, 263
See application file for complete search history.

(56) References Cited

U.S. PATENT DOCUMENTS

| 4,115,917 | A | * | 9/1978 | Charon | ................... | H05B 3/145 |
| | | | | | | 156/291 |
| 4,117,210 | A | * | 9/1978 | Deb | ..................... | H01M 14/005 |
| | | | | | | 429/111 |
| 4,199,637 | A | * | 4/1980 | Sado | ................... | B29C 47/0004 |
| | | | | | | 200/511 |
| 4,369,730 | A | * | 1/1983 | Izu | ......................... | C23C 16/545 |
| | | | | | | 118/50.1 |
| 4,426,339 | A | * | 1/1984 | Kamath | ................. | H01C 7/027 |
| | | | | | | 219/549 |
| 4,541,905 | A | * | 9/1985 | Kuwana | ............. | C25B 11/0489 |
| | | | | | | 204/290.11 |

(Continued)

*Primary Examiner* — Golam Mowla
(74) *Attorney, Agent, or Firm* — Marc Van Dyke Fourth Dimension IP

(57) ABSTRACT

A photovoltaic cell including: (a) a housing including an at least partially transparent cell wall having an interior surface; (b) an electrolyte, disposed within the cell wall, and containing an iodide based species; (c) a transparent electrically conductive coating disposed on the interior surface; (d) an anode disposed on the conductive coating, the anode including: (i) a porous film containing titania, the porous film adapted to make intimate contact with the iodide based species, and (ii) a dye, absorbed on a surface of the porous film, the dye and the porous film adapted to convert photons to electrons; (e) a cathode disposed on an interior surface of the housing, and disposed substantially opposite the anode; (f) electrically-conductive metallic wires, disposed at least partially within the cell, the wires electrically contacting the anode and the electrically conductive coating, and (g) a second electrically conductive coating including an inorganic binder and an inorganic electrically conductive filler, the second coating bridging between and electrically communicating between each of the wires and the transparent coating, the wires adapted to boost collection of a current generated by the cell.

18 Claims, 8 Drawing Sheets

Related U.S. Application Data continuation-in-part of application No. 12/744,914, filed as application No. PCT/IL2008/001550 on Nov. 26, 2008, now abandoned, said application No. 12/814,523 is a continuation-in-part of application No. 12/618,741, filed on Nov. 15, 2009, now abandoned, which is a continuation-in-part of application No. PCT/IL2008/000671, filed on May 15, 2008, said application No. 12/814,523 is a continuation-in-part of application No. 10/754,584, filed on Jan. 12, 2004, now Pat. No. 7,737,356.

(60) Provisional application No. 60/917,941, filed on May 15, 2007, provisional application No. 60/990,307, filed on Nov. 27, 2007.

(56) References Cited

U.S. PATENT DOCUMENTS

| | | | |
|---|---|---|---|
| 4,545,926 A * | 10/1985 | Fouts, Jr. | H01C 7/027 252/502 |
| 4,559,112 A * | 12/1985 | Tamamura | C08G 61/123 205/188 |
| 4,568,791 A * | 2/1986 | Kawai | H01L 31/022466 136/256 |
| 4,730,032 A * | 3/1988 | Rossi | H01B 1/128 526/248 |
| 4,764,664 A * | 8/1988 | Kamath | H05B 3/146 219/528 |
| 4,772,422 A * | 9/1988 | Hijikata | C08K 3/04 252/503 |
| 4,876,440 A * | 10/1989 | Kamath | H05B 3/146 219/528 |
| 4,946,514 A * | 8/1990 | Nakagawa | H01L 31/03921 136/258 |
| 5,106,538 A * | 4/1992 | Barma | C08K 3/0033 252/503 |
| 5,125,971 A * | 6/1992 | Nonami | A61C 8/0012 106/35 |
| 5,441,827 A * | 8/1995 | Gratzel | H01G 9/2031 429/111 |
| 6,069,313 A * | 5/2000 | Kay | H01G 9/2031 136/244 |
| 6,239,352 B1 * | 5/2001 | Luch | H01L 31/048 136/244 |
| 6,291,763 B1 * | 9/2001 | Nakamura | H01G 9/2009 136/252 |
| 6,331,586 B1 * | 12/2001 | Thielen | C08L 23/06 524/401 |
| 6,376,765 B1 * | 4/2002 | Wariishi | H01G 9/2009 136/256 |
| 6,384,321 B1 * | 5/2002 | Mikoshiba | H01G 9/2004 136/256 |
| 6,388,187 B1 * | 5/2002 | Takeyama | H01L 31/0508 136/244 |
| 6,451,433 B1 * | 9/2002 | Oka | H01B 1/02 106/1.23 |
| 6,462,266 B1 * | 10/2002 | Kurth | H01G 9/2031 136/251 |
| 6,469,243 B2 * | 10/2002 | Yamanaka | H01G 9/2031 136/244 |
| 6,657,119 B2 * | 12/2003 | Lindquist | H01G 9/2081 136/251 |
| 6,936,761 B2 * | 8/2005 | Pichler | G02F 1/155 136/252 |
| 2002/0040728 A1 * | 4/2002 | Yoshikawa | H01G 9/2009 136/263 |
| 2002/0047108 A1 * | 4/2002 | Yukinobu | H01B 1/16 252/500 |
| 2003/0230337 A1 * | 12/2003 | Gaudiana | H01G 9/2031 136/256 |
| 2004/0123897 A1 * | 7/2004 | Ojima | H01L 31/022433 136/256 |
| 2004/0140549 A1 * | 7/2004 | Miyagawa | H01L 23/5389 257/700 |
| 2004/0144420 A1 * | 7/2004 | Takeyama | H01L 31/02008 136/256 |
| 2005/0034755 A1 * | 2/2005 | Okada | B32B 17/06 136/256 |
| 2005/0109391 A1 * | 5/2005 | Kobayashi | H01G 9/2004 136/263 |
| 2005/0126629 A1 * | 6/2005 | Okada | H01M 14/005 136/263 |
| 2006/0157103 A1 * | 7/2006 | Sheats | H01L 27/3204 136/244 |
| 2006/0162770 A1 * | 7/2006 | Matsui | H01G 9/2031 136/263 |

\* cited by examiner

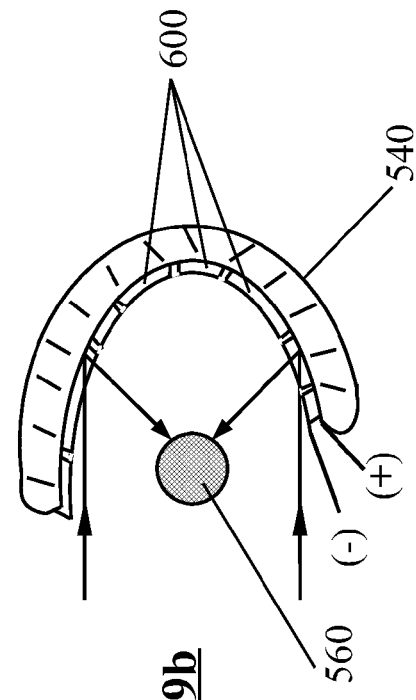
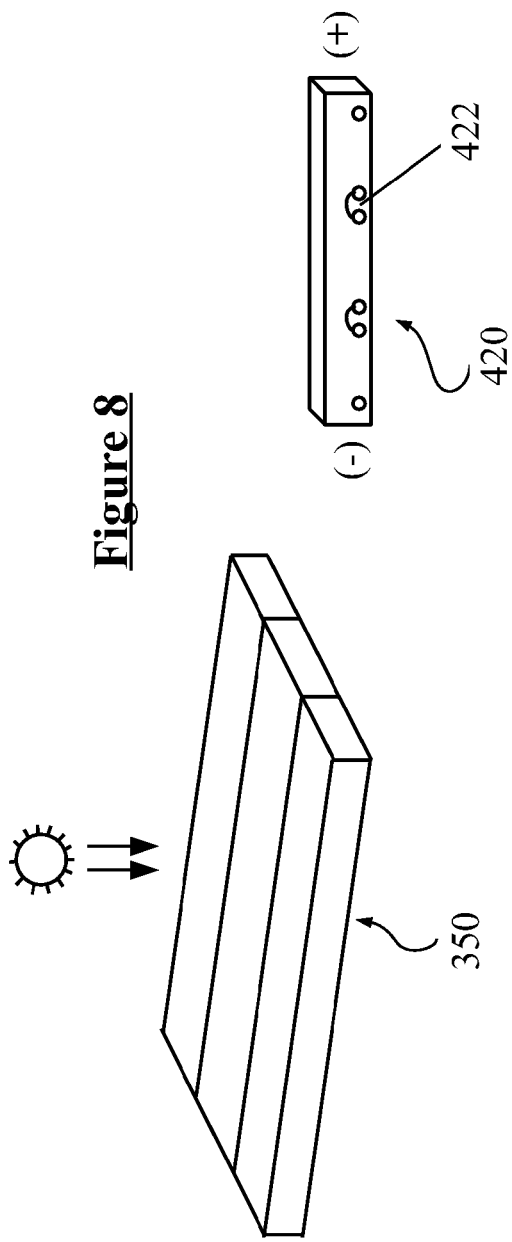
Figure 8
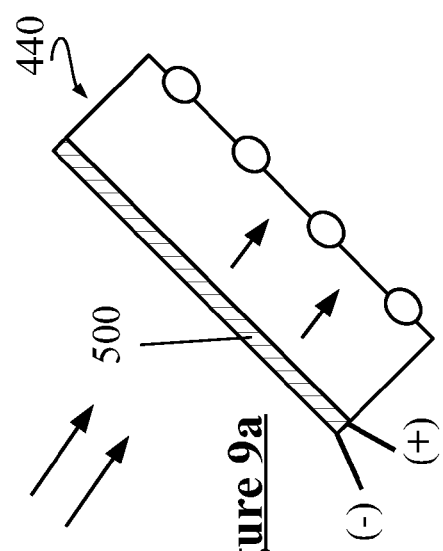
Figure 9a
Figure 9b

SOLAR CELL DEVICE

CROSS-REFERENCE TO RELATED APPLICATIONS

This application is a continuation application of U.S. patent application Ser. No. 14/082,460 filed Nov. 18, 2013, which is a continuation application of U.S. patent application Ser. No. 12/814,523, filed Jun. 14, 2010, which is a continuation-in-part (CIP) application of U.S. patent application Ser. No. 10/754,584, filed Jan. 12, 2004, which draws priority from Israel Patent Application Serial No. 153,895, filed Jan. 12, 2003; U.S. patent application Ser. No. 12/814,523 is also a continuation-in-part (CIP) application of U.S. patent application Ser. No. 12/618,741, filed Nov. 15, 2009, which draws priority from PCT Application No. IL2008/000671, filed May 15, 2008, which draws priority from U.S. Provisional Patent Application Ser. No. 60/917,941, filed May 15, 2007; and a continuation-in-part (CIP) application of U.S. patent application Ser. No. 12/744,914, filed May 26, 2010, which draws priority from PCT Application No. IL2008/001550, filed Nov. 26, 2008, which draws priority from U.S. Provisional Patent Application Ser. No. 60/990,307, filed Nov. 27, 2007, all of which are hereby incorporated by reference for all purposes as if fully set forth herein.

FIELD AND BACKGROUND OF THE INVENTION

The present invention relates to photovoltaic cells (also known as solar cells) for producing electricity from sunlight, and for improved systems and methods therefor.

The invention has particular relevance for solar cells of the dye sensitized type, and is applicable to other types of solar cells, and devices such as screen displays and electronic or defrostable windows where a high current density of operation at minimal ohmic loss is advantageous. A further application is in solar thermal systems (e.g., solar water heaters) where heat and power may be provided from the same collector area/structure.

Dye-sensitized photovoltaic cells for producing electricity from sunlight have been disclosed by U.S. Pat. No. 5,350,644 to Graetzel, et al. U.S. Pat. No. 5,350,644 teaches a photovoltaic cell having a light-transmitting, electrically-conductive layer deposited on a glass plate or a transparent polymer sheet to which a series of titanium dioxide layers have been applied, in which at least the last titanium dioxide layer is doped with a metal ion that is selected from a divalent or trivalent metal.

Following U.S. Pat. No. 5,350,644, U.S. Pat. No. 6,069,313 to Kay teaches a plurality of series-connected cell elements arranged as separate parallel elongated stripes on a common electrically insulating transparent substrate. Each element includes a light facing anode, a counter-electrode or cathode, and an intermediate, light-sensitive electrically-insulating porous layer separating the anode from the cathode. The pores of the intermediate layer are at least partially filled with a liquid phase, ion-transferring electrolyte and a light sensitive dye. An additional current collecting layer of a transparent, electrically-conducting material is situated between the substrate (glass or transparent polymer) and each of the anode and cathode. The anode and cathode of a given cell provide a direct-current voltage when the anode is exposed to light and series assemblies of cells may readily be built up. The cathode of each succeeding element is connected with the intermediate conducting layer of the preceding anode element, over a gap separating the respective intermediate layers of these two elements.

The cells of the above-cited prior art (an example of which is provided in FIG. 1a) are much closer conceptually to battery cells than to conventional photovoltaic cells, since the charge generators are separated by an electrolyte and are not in direct contact. These cells have two electrodes separated by an electrolyte, with one electrode (the photoelectrode) facing the sun. Each electrode is supported on its own current collector, usually a sheet of conducting glass, which is optical glass coated on one side with a thin (about 0.5 microns) transparent layer usually based on electrically-conductive tin oxide, and the conducting glass sheets act as transparent walls of the dye cell.

A transparent polymer may be used in place of glass to support the tin oxide. The photoelectrode includes a transparent porous layer about 10 microns thick (in contact with the tin oxide layer) based on titania, having a nanocrystalline characteristic particle size of 10-50 nm, applied by baking onto the conductive glass or transparent polymer, and impregnated with a special dye. The baked-on titania layer is applied in dispersion form by doctor blading, rolling, spraying, painting, gravure printing, screen printing or printing, but the baking step in some experimental procedures is in excess of 400° C., requiring the use of conducting glass rather than plastic for supporting the titania layer. Other processing procedures for the titania layer are feasible, such as reduced temperature baking, or pressing, usually with some sacrifice in efficiency.

The other electrode (the counter electrode) includes a thin layer of catalyst (usually containing a few micrograms of platinum per square cm) on its respective sheet of tin-oxide coated conductive glass or transparent plastic. The electrolyte in the cell is usually an organic solvent with a dissolved redox species. The electrolyte is typically acetonitrile or a higher molecular weight nitrile, with the redox species being dissolved iodine and potassium iodide—essentially potassium tri-iodide. Other solvents and phases may be used, however.

U.S. Pat. No. 5,350,644 to Graetzel, et al. discloses various dye cell chemistries, especially different dyes based on ruthenium complexes. Photons falling on the photoelectrode excite the dye (creating activated oxidized dye molecules), causing electrons to enter the conduction band of the titania and to flow (via an outer circuit having a load) to the counter-electrode. There, the electrons reduce tri-iodide to iodide in the electrolyte, and the iodide is oxidized by the activated dye at the photoanode back to tri-iodide, leaving behind a deactivated dye molecule ready for the next photon. U.S. Pat. No. 5,350,644 discloses that such dye cells can attain a solar-to-electric conversion efficiency of 10%.

The cells disclosed by U.S. Pat. No. 5,350,644 to Graetzel, et al. (see FIG. 1a), are based on two sheets of conductive glass sealed with organic adhesive at the edges (the conductive glass projects beyond the adhesive on each side, allowing for current takeoff). These cells operate at a voltage of about 650 mV and a current density of 15 mA/square cm under peak solar illumination, with the counter-electrode being the positive pole. It is asserted therein that since the materials and preparation methods are low cost and the titania layer can be prepared in large areas, such cells could potentially provide a good route to low-cost photovoltaic cells. It is further argued that there might be significant cost savings over classical single crystal or polycrystalline silicon cells and even more recent thin-film photovoltaic cells, since these are all high cost and rely on expensive and often environmentally problematic raw materials, together with complex, costly, semiconductor industry processing equipment and production techniques. These drawbacks include the use of vacuum deposition and laser methods, clean-room protocols, use of toxic hydrides such as silane, phosphine etc., as raw materials, and the use of toxic active-layer materials containing cadmium, selenium or tellurium.

The ohmic loss via the conductive glass coated with tin oxide is a major problem of such cells. The tin oxide coating is extremely thin, being limited in thickness usually to below one micron due to the need to maintain a high light transmittance through to the dye/titania layer of the photoanode. Moreover, tin oxide is only semi-conductive and is mechanically weak, such that the current takeoff is significantly limited by such a cell design.

A photovoltaic cell having electrically conducting coatings on spaced, glass support panes is disclosed by U.S. Pat. No. 6,462,266 to Kurth, which is incorporated by reference for all purposes as if fully set forth herein. As shown in FIG. 1b, a portion of a photovoltaic cell 1 is shown in a cross-section with two mutually distanced support panes 2 and 3, which in their border zones are held by a sealing system 4, which extends along the whole circumference. The inner surfaces of support panes 2 and 3 are coated each with a conductive layer 5, and 6, respectively. Layers 5 and 6 are formed by a suitable metal or metal oxide, in the present case, $SnO_2$. On layers 5 and 6, an arrangement of parallel conductor leads 7 and 8 are provided, preferentially made from silver or a silver alloy, or from copper or a copper alloy. These conductor leads are coated each with an insulating coating 10, which insulates conductor leads 7 and 8 electrically towards the interior of the cell. Coating 10 consists of a glass free of heavy metals, which was applied as a glass flow on conductor leads 7 and 8. Onto conductor leads 7 and 8 insulated by the glass coating 10, a further electrically conductive layer 11 and 12 respectively, made from tin oxide or a similar material, can be applied in order to obtain a still higher yield of photovoltaic cell 1. In the border zones of seals 13 and 14, no electrically conductive layers 5 and 6 are provided, i.e., such layers have been eliminated from this zone using a sandblasting process. In this manner, possible short circuits via the seals 13 and/or 14 are avoided. Onto these two seals, a thin layer 15 of a low melt soldering tin is applied in such a manner that exterior weather influences also can not act onto photovoltaic cell 1.

The photovoltaic cell taught by U.S. Pat. No. 6,462,266 has reduced ohmic loss with respect to the cell disclosed by U.S. Pat. No. 5,350,644 to Graetzel, et al., because conductor leads 7 and 8 are good conductors (e.g., silver paste screen printed on and fired at 600° C.), and because the overall thickness of conducting materials has been increased. It must be emphasized that U.S. Pat. No. 6,462,266 teaches strips applied onto tin oxide coated glass and does not teach, nor fairly suggest, the application of conductive strips directly onto the glass (e.g., prior to the application of a tin oxide layer). Furthermore, the emphasis is on single cell construction with no advantage offered for construction of a multi-cell module. Most significantly, the periphery (i.e., the sides) of the cells is devoid of any current takeoff means, any current takeoff being made on the active sun-facing surface of the cell, resulting in a waste of available area. Consequently, the improvement in the cell performance is far from sufficient. U.S. Pat. No. 6,462,266 also emphasizes the application of two separate layers of tin oxide, as well as very high temperature processing that precludes plastic cells.

U.S. Patent Publication No. 20030108664 discloses a substrate with recessed conductors prepared from silver compositions. However, no means for protecting the conductors from corrosion are taught. More importantly, there is no specific means described for achieving the requisite current take-off without wasting available area.

To date, there has been no real commercialization of photovoltaic dye cells, despite the great techno-economic potential thereof. The principal problems remaining include scale-up of cells to widths much above one centimeter—and areas much above 50 square cm—due to excessive ohmic losses from the poorly conducting tin oxide layers on the glass or plastic, long term stability of the dye, and difficulties of sealing the cells against long-term dryout and performance degradation. A further problem in prior art cells and modules has been excessive surface area wasted in seals and conducting paths on the sun-facing side of the cell or module. The active current-producing area in such cases is often less than 70% of the geometric area (footprint) of the cell or module, providing a poor effective efficiency from the available area.

There is therefore a recognized need for, and it would be highly advantageous to have, an electrochemical cell, powered by sunlight, that is simple, efficient and robust, and successfully addresses the manifest shortcomings of the prior art.

SUMMARY OF THE INVENTION

According to a first aspect of the present invention there is provided a photovoltaic cell for converting a light source into electricity, the cell including: (a) a housing for the photovoltaic cell, the housing including an at least partially transparent cell wall, the cell wall having an interior surface; (b) an electrolyte, disposed within the cell wall, the electrolyte containing an iodide based species; (c) an at least partially transparent electrically conductive coating disposed on the interior surface, within the photovoltaic cell; (d) an anode disposed on the at least partially transparent electrically conductive coating, the anode including: (i) a porous film containing titania, the porous film adapted to make intimate contact with the iodide based species, and (ii) a dye, absorbed on a surface of the porous film, the dye and the porous film adapted to convert photons to electrons; (e) a cathode disposed on an interior surface of the housing, the cathode disposed substantially opposite the anode; (f) a plurality of electrically-conductive metallic wires, disposed at least partially within the photovoltaic cell, the metallic wires electrically contacting the anode and the at least partially transparent electrically conductive coating, and (g) a second electrically conductive coating including an inorganic binder and an inorganic electrically conductive filler, the second coating bridging between and electrically communicating between each of the electrically-conductive metallic wires and the at least partially transparent electrically conductive coating, the electrically-conductive metallic wires configured to boost collection of a current generated by the cell.

According to another aspect of the present invention there is provided a photovoltaic cell for converting a light source into electricity, the cell including: (a) a housing for the photovoltaic cell, the housing including an at least partially transparent cell wall, the cell wall having an interior surface; (b) an electrolyte, disposed within the cell wall, the electrolyte containing an iodide based species; (c) an at least partially transparent electrically conductive coating disposed on the interior surface, within the photovoltaic cell, the at least partially transparent electrically conductive coating including tin oxide; (d) an anode disposed on the at least partially transparent electrically conductive coating, the anode including: (i) a porous film containing titania, baked on to the electrically conductive coating, the porous film adapted to make intimate contact with the iodide based species, and (ii) a dye, absorbed on a surface of the porous film, the dye and the porous film adapted to convert photons to electrons; (e) a cathode disposed on an interior surface of the housing, the cathode disposed substantially opposite the anode; (f) a plurality of electrically-conductive metallic wires, disposed at least partially within the photovoltaic cell, the metallic wires electrically contacting the anode and the at least partially transparent electrically conductive coating, and (g) a second electrically conductive coating including a binder and an electrically conductive filler, the second coating bridging between and electrically communicating between each of the electrically-conductive metallic wires and the at least partially transparent electrically conductive coating, the second coating baked on to the electrically conductive coating, the electrically-conductive metallic wires configured to boost collection of a current generated by the cell.

According to yet another aspect of the present invention there is provided a photovoltaic cell for converting a light source into electricity, the cell including: (a) a housing for the photovoltaic cell, the housing including an at least partially transparent cell wall, the cell wall having an interior surface; (b) an electrolyte, disposed within the cell wall; (c) an at least partially transparent electrically conductive coating disposed on the interior surface, within the photovoltaic cell; (d) an anode disposed on the at least partially transparent electrically conductive coating, the anode including: (i) a porous film, baked on to the electrically conductive coating, the porous film adapted to make intimate contact with the electrolyte, and (ii) a dye, absorbed on a surface of the porous film, the dye and the porous film adapted to convert photons to electrons; (e) a cathode disposed on an interior surface of the housing, the cathode disposed substantially opposite the anode; (f) a plurality of electrically-conductive metallic wires, disposed at least partially within the photovoltaic cell, the metallic wires electrically contacting the anode and the at least partially transparent electrically conductive coating, and (g) a second electrically conductive coating including a binder and an electrically conductive filler, the second coating bridging between and electrically communicating between each of the electrically-conductive metallic wires and the at least partially transparent electrically conductive coating, the second coating baked on to the electrically conductive coating.

According to further features in the described preferred embodiments, the inorganic, electrically conductive filler is selected from the group consisting of metal powders, metal oxides, metal carbides, metal borides, metal silicides, and metal nitrides.

According to still further features in the described preferred embodiments, the inorganic, electrically-conductive filler includes titanium nitride.

According to still further features in the described preferred embodiments, the photovoltaic cell further includes: a current collection element, disposed at least partially on a side of the cell wall, the current collection element electrically connected to the metallic wires, and configured to remove therethrough the current produced by the cell.

According to still further features in the described preferred embodiments, the second coating contains an electrically-conductive metal material selected from the group of titanium, tungsten, molybdenum, chromium, vanadium and tantalum.

According to still further features in the described preferred embodiments, the transparent conductive coating includes a tin-oxide based conductive coating.

According to still further features in the described preferred embodiments, the conductive filler contains an inorganic electrically-conducting material in a form selected from the group consisting of powders, fibers, flakes, and whiskers.

According to still further features in the described preferred embodiments, the second coating contains an electrically-conducting material selected from the group consisting of tin oxide, magneli oxides, spinel oxides, and perovskite oxides.

According to still further features in the described preferred embodiments, the binder contains at least one inorganic binder material selected from the group consisting of alumina and silica.

According to still further features in the described preferred embodiments, the binder contains at least one inorganic binder material including a glass.

According to still further features in the described preferred embodiments, disposed in the interior surface of the cell wall is a plurality of grooves, each of the grooves at least partially containing the second coating and a wire of the wires.

According to still further features in the described preferred embodiments, the porous film containing titania is baked on to the electrically conductive coating.

According to still further features in the described preferred embodiments, the second coating is baked on to the electrically conductive coating.

According to still further features in the described preferred embodiments, the electrically-conductive metallic wires are based on at least one metal selected from the group of metals consisting of titanium, tungsten, molybdenum, chromium, and tantalum.

According to still further features in the described preferred embodiments, the second coating contains an electrically-conductive material selected from the group consisting of metal powders, metal oxides, metal carbides, metal borides, metal silicides, and metal nitrides.

According to still further features in the described preferred embodiments, disposed in the interior surface of the cell wall is a plurality of grooves, each of the grooves at least partially containing the second coating and a wire of the wires.

According to still further features in the described preferred embodiments, the iodide based species includes tri-iodide or iodine.

According to still further features in the described preferred embodiments, the housing of the photovoltaic cell includes an opening for replacement of at least one component of the cell.

According to still further features in the described preferred embodiments, this component is the electrolyte.

According to still further features in the described preferred embodiments, this component is a dye.

According to still further features in the described preferred embodiments, two or more of the photovoltaic cells are electrically connected in series.

According to still further features in the described preferred embodiments, the photovoltaic cells are electrically connected in series solely by the current collection element.

According to still further features in the described preferred embodiments, the interior surface has at least one groove, and within the at least one groove is disposed the electrically conductive element for conducting a current produced by the photovoltaic cell.

According to still further features in the described preferred embodiments, the conductive material is physically isolated from the electrolyte by a material that is chemically inert to the electrolyte.

According to still further features in the described preferred embodiments, the conductive material is physically isolated from the electrolyte by a second material, the second material being chemically inert to the electrolyte.

According to still further features in the described preferred embodiments, the second material is a substantially non-conductive material.

According to still further features in the described preferred embodiments, the second material is a second conductive material.

According to still further features in the described preferred embodiments, the second conductive material includes a material selected from the group consisting of graphite, tin oxide, and titanium nitride.

According to still further features in the described preferred embodiments, the conductive material is electrically associated with a layer of tin oxide. According to still further features in the described preferred embodiments, the at least partially transparent conductive coating includes tin oxide. According to still further features in the described preferred embodiments, the electrical resistance of the coating exceeds 10 ohms per square. According to still further features in the described preferred embodiments, the electrical resistance of the coating exceeds 20 ohms per square.

According to still further features in the described preferred embodiments, the at least partially transparent conductive coating includes tin oxide, and the electrical resistance of the coating exceeds 30 ohms per square. Preferably, a low-cost, low-grade tin oxide coating can be used, having an electrical resistance exceeding 50 ohms per square, and even exceeding 50 ohms per square.

According to still further features in the described preferred embodiments, the tin oxide is a low-grade tin oxide prepared by a process selected from the group consisting of sol-gel process, vapor deposition process, plasma, and dip spray process.

According to still further features in the described preferred embodiments, the photovoltaic cell further includes a seal selected from the group consisting of gasket and O-ring, and a closure for pressuring the seal so as to seal the photovoltaic cell, the closure selected from the group consisting of crimp closure and bolted closure.

According to still further features in the described preferred embodiments, the cell wall includes plastic, or is made entirely of plastic.

According to still further features in the described preferred embodiments, an edge seal of the cell wall is made primarily of a material selected from the group consisting of low-temperature glass, polymer, inorganic adhesive, and According to still further features in the described preferred embodiments, the conductive coating includes titanium nitride and a binder that is substantially chemically inert with respect to the electrolyte.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 8 is a schematic perspective view of a sheet plastic honeycomb support structure for housing photovoltaic cells, according to the present invention;

FIGS. 9a and 9b are schematic, cross-sectional views of fixed flat plate conventional solar water heaters or tracking trough-type collectors for solar thermal power installations integrated with cells or panels of the present invention, for simultaneous production of electricity and hot water using the basic supporting structural unit and collector area of the solar water heaters/collectors.

DESCRIPTION OF THE PREFERRED EMBODIMENTS

Figure 1A:
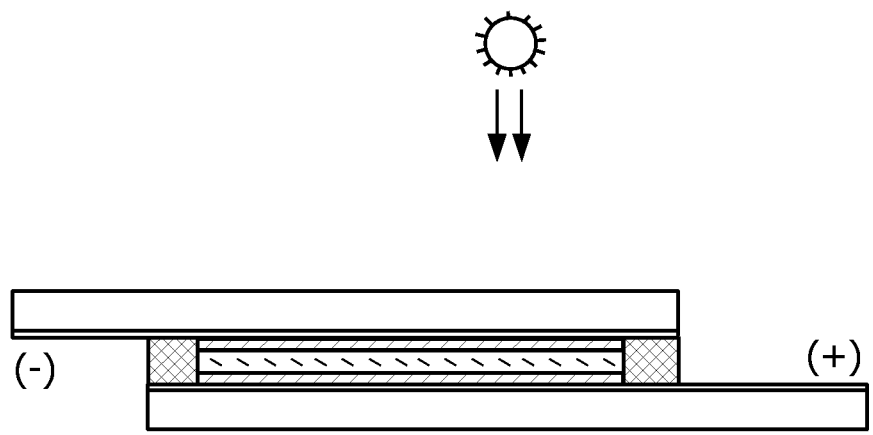
FIG. 1a is a cross-section of a photovoltaic cell taught by U.S. Pat. No. 5,350,644 to Graetzel et al.
Figure 1B:
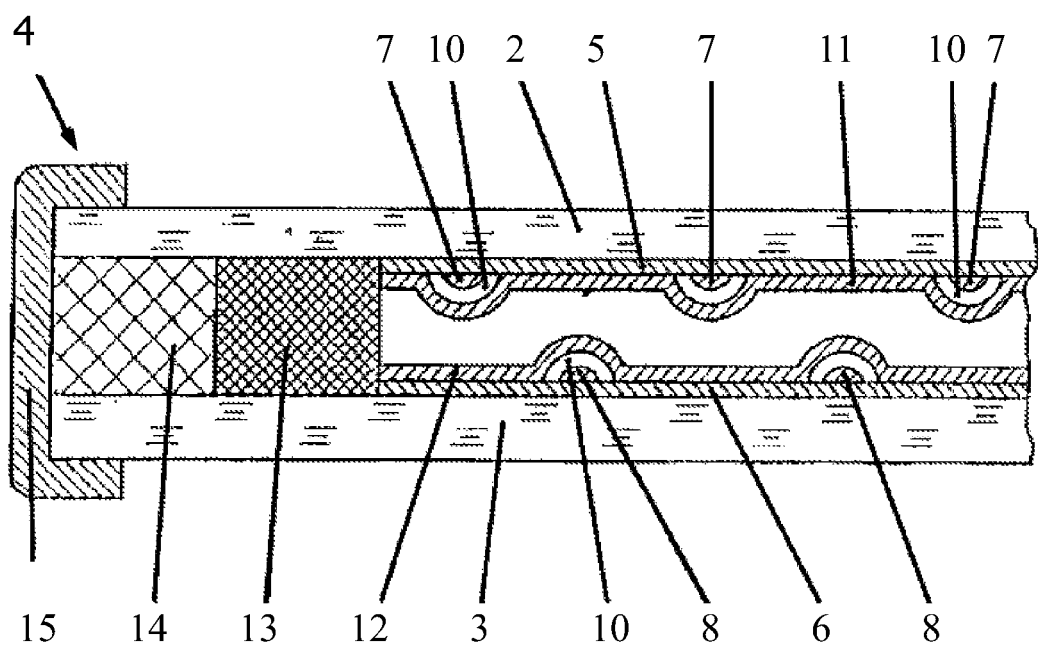
FIG. 1b is a cross-section of a photovoltaic cell as disclosed by U.S. Pat. No. 6,462,266 to Kurth.

The principles and operation of the photovoltaic cells according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention overcomes these and other problems and paves the way to the manufacture of an efficient, commercially viable device. Various aspects and embodiments of the present invention are described hereinbelow:

One aspect of the present invention provides a means for greatly reducing the effective ohmic loss from the electrically-conducting support of the titania-based photoactive layer of photovoltaic dye cells. This support is usually poorly-conducting, tin oxide coated glass or plastic alone, and usually necessitates a width under 1 cm, in which the seal (usually a polymer strip of 1-2 mm width) can take up an excessive proportion. The present invention enables the construction of large area (50-200 square cm), wide (2-5 cm or more) dye cells. Moreover, the fraction of cell or module footprint taken up by conductors and seals on the sun-facing surface of cells is reducible to an acceptable level of less than 10%.

One major approach of the present invention is the incorporation of conductivity-augmenting strips (at periodic intervals on the surface in a striped or meshed pattern) on top of or beneath the face of the glass or plastic, while the strips are in electrical contact with a tin oxide based or other electrically-conductive transparent layer covering the glass or plastic and on top of or beneath these strips. The strips are designed to shade only a small fraction (preferably less than 5%) of the available light entering the cell, and can be applied directly on the glass or plastic. The strip dimensions (length, width, thickness and number of strips) and the conductivity of the strip material must be consistent with the conductivity-boosting properties required from the photoelectrode. Although it might be possible to use for the strips simply applied and unprotected common conductors such as silver, copper, aluminum, nickel and the like, the corrosive nature of the electrolyte (especially the presence of iodine and nitrites in the liquid phase) usually obligates use of more corrosion-resistant metals or conductive materials (such as titanium, metal carbides etc.), or at the very least, sealed-in strips of the common conductors.

In one preferred embodiment, the strips are deposited directly onto the surface of a glass or a plastic coated with a transparent conductive oxide such as tin oxide. The strips are based on molybdenum, chromium, tantalum, vanadium and/or titanium, in the form of metal, alloy, metal oxides, carbides, nitrides borides or silicides. Preferably, a vapor phase deposition process is used such as sputtering, in conjunction with mechanical or chemical masking, to achieve the strip pattern. In the case of chromium, electro-deposition of strips is also possible. Since the external surfaces of strips may still be active to catalyze at the photoanode unwanted, efficiency-reducing recombination of charge carriers, an inert-to-recombination tin oxide (or other inert, conducting covering layer such as titanium nitride) can advantageously be applied to these external surfaces. Also, the ends of the strips can terminate in a perimeter strip around the edge of the glass, and/or continue over onto the edge of the glass, for cell sealing or current takeoff purposes.

In another preferred embodiment, the strips are inert foils or wires (e.g., titanium, molybdenum, or clad materials such as titanium that is clad on copper) bonded directly onto the tin oxide coated glass using an inert conducting adhesive. The adhesive can include an inert, conducting filler (e.g., titanium powder, molybdenum powder, tungsten powder, graphite powder or titanium nitride powder) combined with an inert binder from the phosphate, silicate, low temperature glasses, aluminate, titanate or zirconate families (e.g., potassium silicate), such that both the filler and the binder are stable during the high-temperature processing of the titania photoactive layer and during exposure to the electrolyte within the cell. If the titania is processable at lower temperatures (e.g., up to 300° C.), then inert polymer binders such as Teflon® may be used. In the case of the conductors continuing over onto the edge of the glass, an important benefit is that current may be removed from cells without seriously reducing the available area of the cell.

In another preferred embodiment, the strips are located in grooves in the glass or plastic surface, below, but in electrical contact with, the tin oxide layer. In this embodiment, the glass or plastic is first grooved, and a conductive transparent layer of tin oxide is applied by vacuum deposition, spray pyrolysis or sol-gel means (depending on the glass or plastic used) such that tin oxide enters also at least partly into the grooves to ensure maintenance of surface electrical continuity with the groove contents. After this step, at least one of electrically conductive strips, wires or conducting paste is introduced into the grooves, and an additional, optionally electrically conductive layer bonds, seals and encapsulates the strip, wire or paste in the grooves, preferably filling each groove up to the surface of the glass or plastic. In the case of cell walls based on plastic, the groove structure may be pre-molded into the plastic. In the case of glass, stresses in the grooved glass can be reduced by annealing in conjunction with mechanical grooving. Alternatively, the grooving may be performed using laser, abrasive, ultrasonic or chemical etching means.

The above procedure describes coating the grooved glass or plastic with a conductive tin oxide layer before filling the grooves with conductor, but it is also feasible to coat with tin oxide following groove filling. Due to the corrosive nature of the electrolyte, useful materials for the strips, wires, and pastes are based on titanium, tungsten, molybdenum, chromium, tantalum, graphite, or carbon, or clad materials such as titanium clad on copper and if well sealed-in, also silver, copper, aluminum, nickel, and tin. The optionally conductive paste or encapsulant may also advantageously be made from inert conducting powders, fibers, flakes, or whiskers such as graphite, carbon black, tin oxide, magneli oxides, spinel or perovskite oxides, or tungsten, tantalum, titanium, vanadium, chromium or molybdenum as metal powders, oxides, carbides, borides, silicides, or nitrides, together with an organic or inorganic curable binder. Useful inorganic binder compositions include silicates, aluminates, phosphates, zirconates and low melting glasses that may include silica. If the sealing layer is preferred to be non-conductive, then the conductive filler is simply omitted. The conductor beneath the sealing encapsulant layer may, if necessary, be provided by paste, electrochemical plating, plasma or vapor deposition means.

Onto the tin oxide coated glass or plastic with the surface or subsurface strips, the titanium oxide layer is deposited as in a conventional dye cell (e.g., by baking or pressing), and after impregnation with dye, acts as the photoanode. Current takeoff is from the extremities of the strips or grooves, using a separate paste layer or contacting metal contacts.

A similar ohmic loss reducing strategy may be used for the counter-electrode, based on a glass or plastic wall which can be coated (like the anode) with a transparent, conducting tin oxide layer, and can also be fitted with overlaying strips, or grooves containing conductive elements. As is usual for conventional dye cell counter-electrodes, the tin oxide surface is coated with a thin coating of platinum catalyst. The platinum may be in supported form (e.g., supported on carbon or graphite) or may be substituted by a non-noble electrocatalyst equivalent, such as a metal carbide or a tungsten bronze oxide, alone or supported on carbon or graphite. For example, the platinum layer may be deposited on the tin oxide coated glass or plastic by thermal decomposition of a platinum precursor (e.g., chloroplatinic acid solution), by electrochemical plating, or by vapor deposition means such as sputtering. Alternatively, a layer of catalyst in continuous form (e.g., by spray means) or web form (e.g., by printing means), supported if necessary by an inert polymer binder such as Teflon®, may be applied to a grooved glass or plastic wall fitted with conductive strips and optionally coated with tin oxide. Current takeoff from each electrode is by a current collecting contact (strip or wire or paste) that connects outside the cell with the strips or wires or paste emerging on top of the glass/plastic or from the grooves in the glass/plastic. Inter-cell connection may be effected by joining of these current collectors (mechanical means, soldering or welding means, etc.). It is particularly easy to connect up large numbers of cells in series to make a solar panel.

In another aspect of the present invention, appropriate especially for cases where the titania layer must be baked at high temperatures (e.g., 450° C.) significantly above the tolerance range of plastics, it is possible to dispense entirely with the need for a tin oxide coating on cell glass or plastic walls. The titanium oxide layer is prepared on a separate heat-resistant underlying support at 450° C. by baking on.

The underlying support is preferably an open, inert, electrically-functional structure, e.g., a conducting porous mat (such as carbon fiber veil, or titanium metal mesh). Such support materials are, if necessary, made inert to the iodine redox reaction by coating with an inert material having poor or negligible electro-catalytic properties for the iodine redox reaction (such as tin oxide or titanium nitride).

Once the titania has been baked on, an additional porous inert conductive underlayer (i.e., between the titania and the counter-electrode) or overlayer (i.e., between the titania and the upper cell wall facing the sun) such as tin oxide, titanium nitride or magneli oxide can be added. Such an underlayer or overlayer can be deposited onto the titania using spray or plasma means. Alternatively, the conductive layer can be bonded (if necessary) using a suitable inert polymer binder (such as Teflon®) that is sinterable at 300° C. or less. The conductive layer can be added on top of or under the layer of titania. It should be mentioned that the titania with a tin oxide overlayer gives a translucent electrode.

Such support structures (e.g., via a suitable tab on one or both ends of the mesh) can sealably be brought through polymer seals or gaskets to serve as current collectors between adjacent cells. The counter-electrode can be made similarly using a carbon fiber veil or titanium mesh. Here, of course, there is no need for a baked titania layer or titanium nitride inert coating, but instead, the mesh or veil can be lightly catalyzed with platinum, or preferably coated with a porous catalytic layer of graphite or carbon (optionally catalyzed) bonded using a suitable inert binder such as Teflon®.

Of course, the use of two conducting meshes or veils in a cell will oblige the use of a separator in the cell. Although porous plastic separators are possible, greatest endurance is expected using inert glass fiber porous separators.

Figure 2:
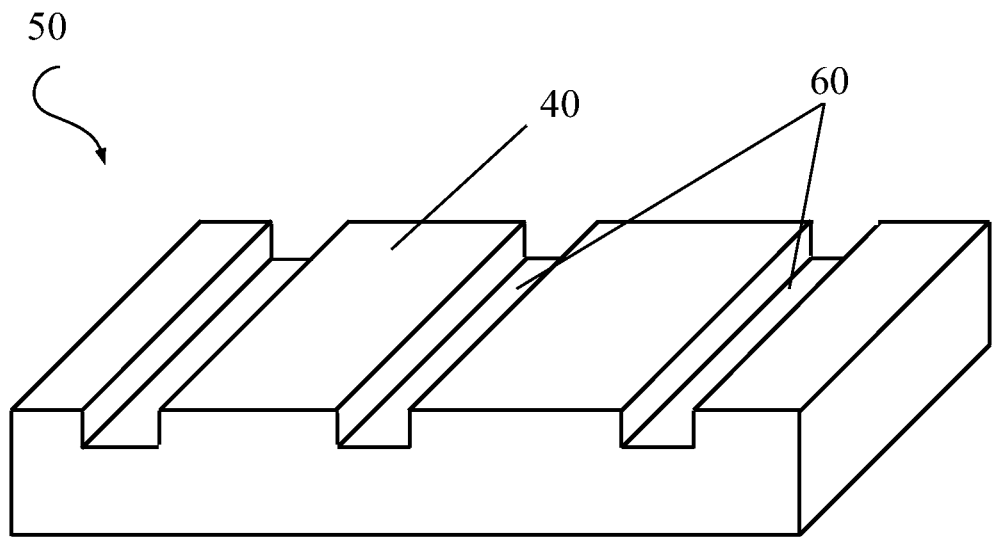
FIG. 2 is a schematic perspective illustration of a grooved cell wall, according to one aspect of the present invention.

In another preferred embodiment of the present invention, a surface 40 of an at least semi-transparent cell wall 50 is provided with a plurality of grooves 60, as illustrated schematically in FIG. 2. Surface 40 is an interior surface of the cell, as will be evident from FIG. 3a and from the description hereinbelow. Cell wall 50 is typically made of glass or plastic. Grooves 60, which can be of various shapes and designs, typically have a depth of tens to hundreds of microns (micrometers).

Figure 3A:
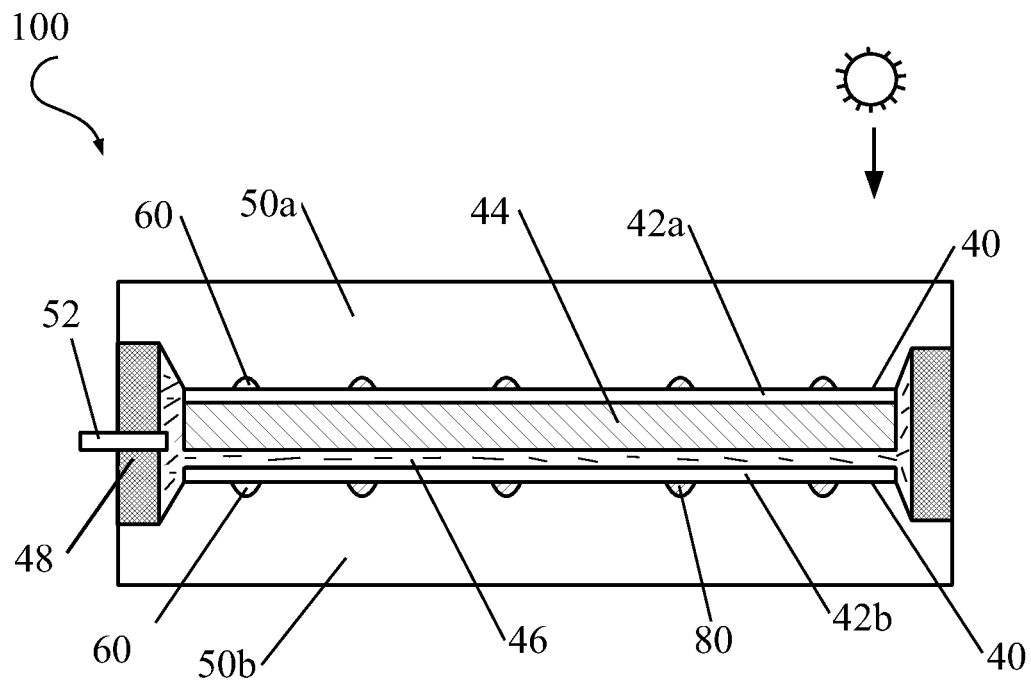
FIG. 3a is a schematic side, cut-away view of a preferred embodiment of the inventive photovoltaic cell.

FIG. 3a provides a schematic side, cut-away view of a photovoltaic cell 100 of the present invention having an anode cell wall 50a and a cathode cell wall 50b, both provided with a plurality of grooves 60 in interior surface 40. Grooves 60 are at least partially filled with a conductive material 80, which is typically in the form of electrically conductive strips, wires or conducting paste.

Figure 3B:
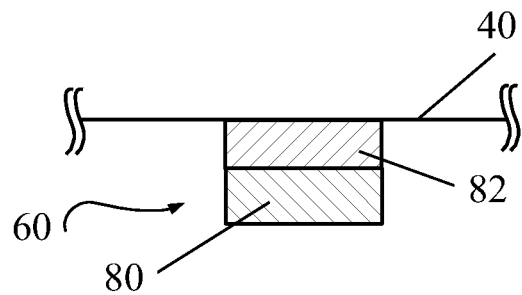
FIG. 3b is a schematic, cross-sectional view of a groove partially filled with a first conductive material, which is encapsulated and sealed by a second conductive material.

Optionally and preferably, and as shown in FIG. 3b, an additional electrically conductive layer 82 bonds, seals and encapsulates conductive material 80, filling each groove 60 up to interior surface 40 of cell wall 50a or 50b. (If, via shrinkage on curing, the conductive filling sinks appreciably below interior surface 40, as in the case of a conductive paste after curing, at least one additional application of paste may be required, or alternatively, the conductive paste may be applied on top of a heat-removable, mechanically removable or chemically-removable spacing layer of paper, plastic, metal or other suitable coating on the glass/plastic that has been cut to expose the grooves).

Referring back to FIG. 3a, covering interior surface 40 of anode cell wall 50a is an electrically-conductive transparent layer 42a. Similarly, interior surface 40 of cathode cell wall 50b is covered by an electrically-conductive transparent layer 42b, which typically includes a catalyst coating. Adjacent and substantially parallel to electrically-conductive transparent layer 42a is a titania/dye layer 44. Between titania/dye layer 44 and electrically-conductive transparent layer 42b is disposed an electrolyte 46 that is absorbed in the titania/dye layer.

The operation of photovoltaic cell 100 is similar to the cell disclosed in U.S. Pat. No. 5,350,644 to Graetzel, et al., and is well understood by those skilled in the art.

The sealing of photovoltaic cell 100 can be performed in various ways. In FIG. 3a, photovoltaic cell 100 is sealed by an adhesive sealant layer 48 disposed at the sides of cell 100.

Optionally and preferably, a fill tube 52 is disposed within adhesive sealant layer 48, to allow for periodic refilling/replacement of electrolyte 46 or the dye layer in titania/dye layer 44, as needed.

When cell wall 50a or 50b is based on plastic or similar materials, the groove structure may be cut or molded into the plastic. When cell wall 50a or 50b is based on glass or the like, annealing may be performed in conjunction with mechanical grooving, so as to reduce stresses in the grooved cell wall. Alternatively, it is possible to carry out the grooving using laser, abrasive, air jet, water jet, ultrasonic, chemical etching, or other means known in the art. Grooves 60 are rectilinear, V-shaped or U-shaped or of another toolable or moldable profile. Preferably, there should not be a sharp angle at the outer extremity of grooves in order to better accept and support a continuous coating. For example, the outer edge of the groove may be given a radius as part of the grooving operation or as a separate step. Following curing of the paste or encapsulating layer, the glass or plastic is coated with tin oxide by conventional spray, vapor deposition, plasma deposition, or sol-gel means.

It has been found that although prior art cells demand only highest quality grade tin oxide coatings with highest conductivities (usually below 10 ohms per square) and correspondingly high cost, the present invention utilizes grooves or strips so as to allow the use of much lower grade tin oxides, even in the relatively poor conductivity range of 20-100 ohms/square and above. This allows for the utilization of less expensive materials and manufacturing techniques. It is also possible to coat the grooved glass or plastic with tin oxide (prior to the bonding of the strips or wires or paste in the grooves by means of the conducting adhesive or sealant) and conductivity continuity is assured by at least part of the tin oxide entering into the grooves and thereby contacting the conducting filling.

Similarly, in another preferred embodiment, it is possible to cut the grooves in standard, commercially-available tin oxide coated glass or plastic and then apply (e.g., by coating, printing or spraying, advantageously with the help of a mask) and creating over the grooves a thin bridging layer of electrically conducting paste (i.e., bridging onto the tin oxide) to ensure electrical continuity.

Although Graetzel-cell technology has been traditionally been limited to cell walls of specialized glass that is suitable for the high temperature preparation/bonding of the titania layers, recently, good quality titania layers have been prepared without recourse to such elevated temperatures by, inter alia, mechanical pressing of titania layers (suspended in a solvent, and applied by brushing, spraying or rolling methods) after evaporating off the solvent (see U.S. Patent Application No. 20020106447 to Lindstrom, et al., which is incorporated by reference for all purposes as if fully set forth herein). It must be emphasized that the present invention is especially suited to dye cells with pressed layers and excellent performance is obtained, especially if the titania layer is deposited by electrophoresis prior to pressing.

Figure 4:
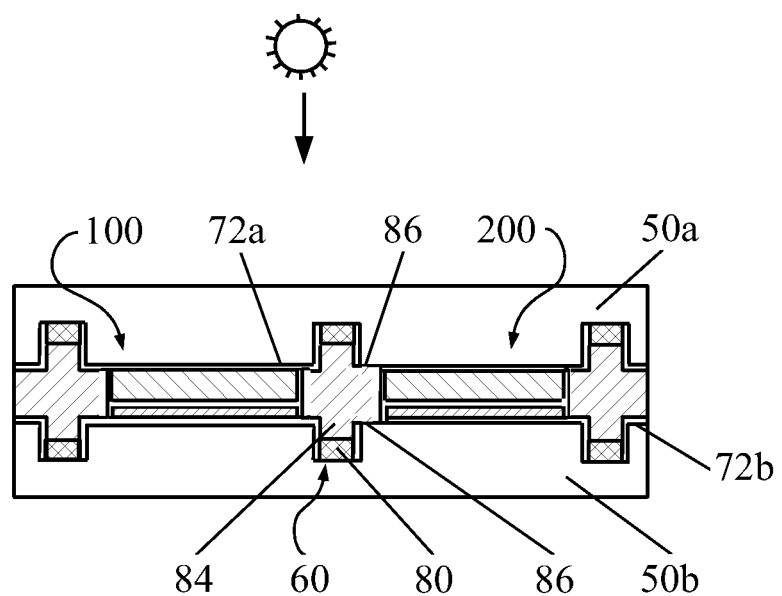
FIG. 4 is a schematic, cut-away side view of a two-cell module, shown without side-placed contacts.

FIG. 4 is a cut-away side view of a two-cell module, shown without side-placed contacts. Each groove 60 is partially filled with conducting material 80, and then with an insulating material 84. Preferably, insulating material 84 is a sealant, such that the sealant can advantageously serve also as a sealing barrier between adjacent cells 100, 200. Heat-sealable materials (e.g., Suryln®), or curable materials (e.g., epoxy, polytetrafluoroethylene, inorganic adhesives such as ceramic adhesives, and low temperature glass sealants fireable up to the titania baking temperature) are suitable for this purpose.

Figure 5B:
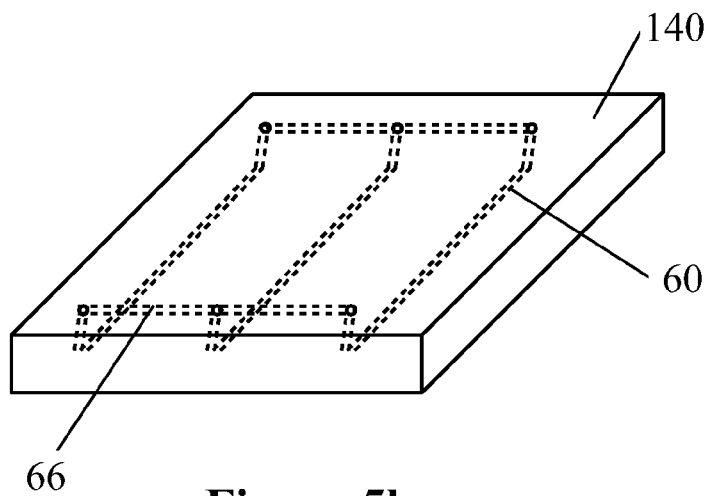
FIG. 5b shows a cell having grooves for filling with a conducting material, the grooves passing through holes in a top surface of the cell for facile current take-off.
Figure 5A:
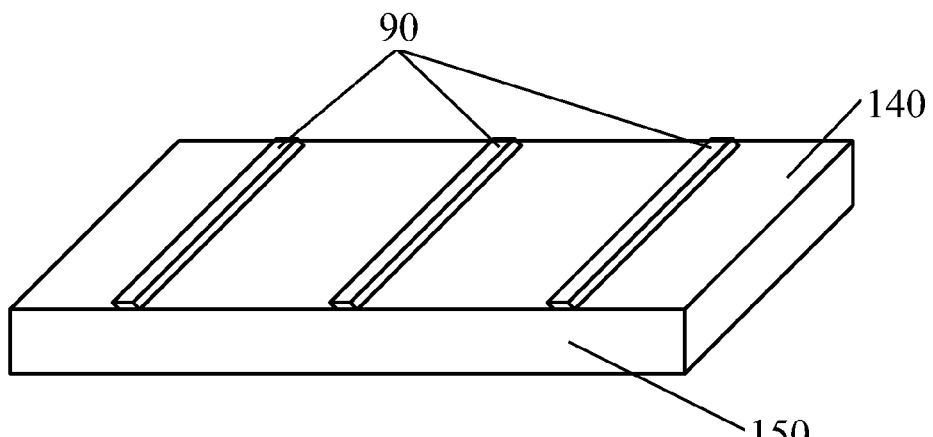
FIG. 5a is a schematic perspective view of a conductive cell wall having strips deposited directly onto the surface.
Figure 7:
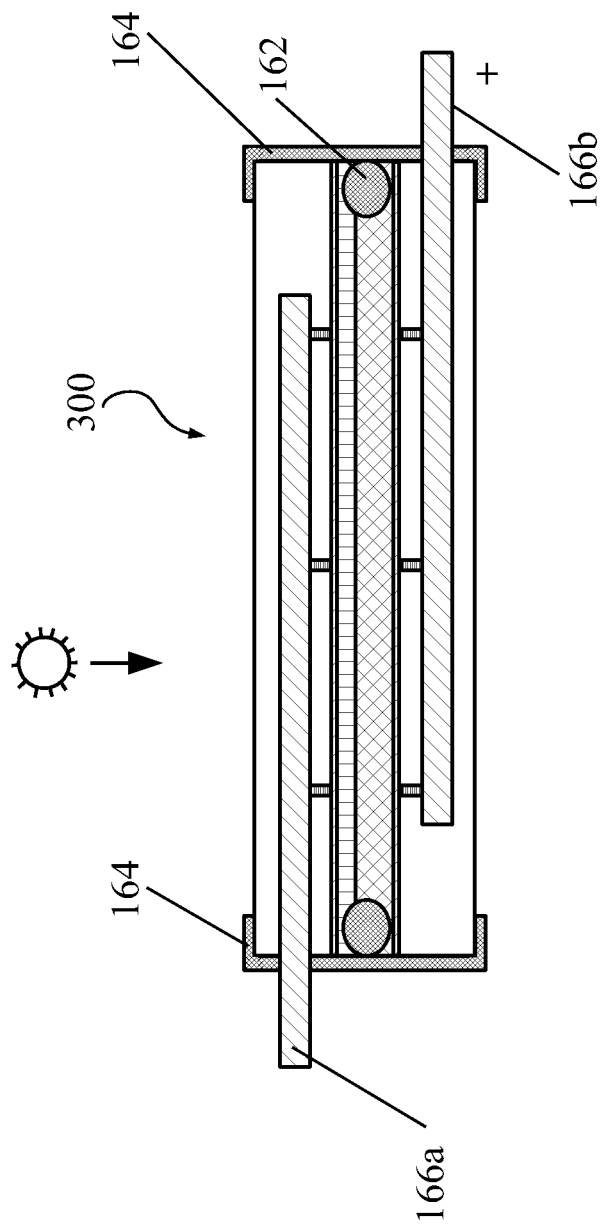
FIG. 7 is a schematic, cross-sectional view of cell of the present invention having a crimp and gasket sealing system.

It must be emphasized that cells 100, 200 must be electrically isolated from one another. To this end, it is necessary to have a break 86 in both tin oxide layer 72a on the anode side and tin oxide layer 72b on the cathode side. In another preferred embodiment, strips 90 are deposited directly onto the interior surface 140 of a conductive glass or plastic cell wall 150, as shown in FIG. 5a. The strips are based on molybdenum, chromium, tantalum, vanadium, and/or titanium in the form of metal, alloy, or metal oxides, carbides, nitrides, borides or silicides, in which a vapor phase deposition process may be used such as sputtering, in conjunction with mechanical or chemical masking to achieve the strip pattern. (In the case of chromium, electro-deposition of strips is also possible, while titanium may be applied as a metal strip or clad strip such as titanium on copper onto a conducting adhesive). Since the external surfaces of strips 90 may still be sensitive to corrosion or active to parasitic catalysis, at the photoanode, of unwanted (efficiency-reducing) recombination of charge carriers, an inert conductor such as titanium nitride) can advantageously be applied to these external surfaces and can also act to encapsulate against corrosion. For example, strips could be first laid down on plain glass or plastic and then covered with tin oxide. In this approach, the strip thickness is preferably less than the wet applied titania layer thickness before baking. It must be emphasized that, unlike the prior art of U.S. Pat. No. 6,462,266 to Kurth, the ends of the conductive strips preferably terminate in a perimeter strip around the edge of the glass/plastic, as shown in FIG. 7, and/or continue over onto the edge of the cell wall, for cell sealing or current takeoff purposes. The latter strategy allows for a high utilization of cell total area (about 90%), since current takeoff is performed mainly at the edges of the cell, and not in the plane of illumination.

Due to the corrosive nature of the electrolyte, we have found useful materials for the strips, wires, and pastes to be based on titanium, tungsten, molybdenum, chromium, tantalum, bismuth, graphite, or carbon, and if well sealed in, also silver, copper, aluminum, nickel, tin and solder, while the paste or encapsulant may also advantageously be from inert conducting powders, fibers or whiskers such as graphite, carbon black, tin oxide, magneli oxides, spinel or perovskite oxides, or tungsten, tantalum, titanium, vanadium, chromium or molybdenum as metal powders, oxides, carbides, borides, silicides, or nitrides, together with an organic or inorganic curable binder. The conductor beneath the sealing encapsulant layer may if necessary be provided by paste, electrochemical plating, plasma, chemical deposition, metalizing, screen printing, sputtering or vapor deposition means. In contrast to U.S. Pat. No. 6,462,266, the conductor may be laid down at convenient lower temperatures (e.g., up to 200° C.) enabling application onto plastics. As described above, the sealant in the grooves (or covering the coated strips) may alternatively be non-conductive, based on inert material, and the sealant layer can advantageously serve as a dividing barrier between adjacent cells.

Onto the tin oxide coated glass or plastic with the surface or subsurface strips, the titanium dioxide layer is deposited as in a regular dye cell (e.g., by baking or pressing), and after impregnation with dye and electrolyte, acts as the photoanode. Current takeoff is from the extremities of the strips or grooves, outside the cell itself, using a separate paste layer or contacting metal contacts. The extremities are advantageously sealed off using polymer or glass sealants.

A similar ohmic loss reducing strategy may be used for the counter electrode, based on a glass or plastic wall fitted with overlaying strips, or grooves containing conductive elements, optionally coated with tin oxide, with (as is usual for dye cell counter-electrodes) a thin catalyst coating (such as platinum, or a non-noble electro-catalyst equivalent such as a metal carbide or oxide, alone or supported on carbon or graphite). For some applications, high surface area carbons and graphites provide adequate catalytic effectivity. For example, a platinum layer may be deposited on the glass, plastic (or tin oxide coated versions of these) by electrochemical plating or vapor deposition means such as sputtering. Alternatively, a layer of catalyst in continuous (e.g., by spray means) or web form (e.g., by printing means), supported if necessary by a binder such as polytetrafluoroethylene (Teflon®), may be applied to a glass or plastic wall fitted with conductive strips and optionally coated with tin oxide. In cells, current takeoff from each electrode is by a current collecting contact (strip or wire or paste) that connects outside the cell with the strips, wires or paste emerging on top of the glass/plastic or from the grooves in the glass/plastic. One particularly advantageous embodiment (e.g., in the case of moldable plastic walls) is provided in FIG. 5b. Grooves 60, filled with a conducting material, pass through holes in top surface 140, so as to enable current take-off from top surface 140, while leaving the plate extremities free for sealing. Current takeoff is preferably achieved by means of a collecting strip 66 connecting grooves 60.

Inter-cell connection may be by joining of these current collectors (mechanical means, soldering or welding means, etc.). It is particularly easy to connect up large numbers of cells in series to provide a solar panel.

Figure 6A:
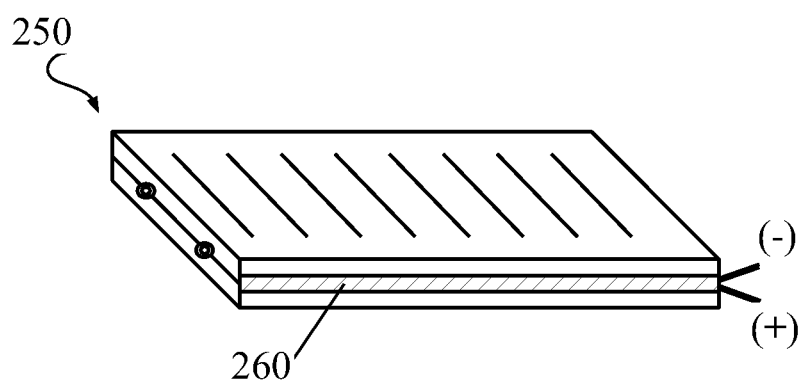
FIG. 6a is a schematic, perspective illustration of a modular cell of the present invention, having an encapsulated, conducting perimeter strip for interconnecting with additional modular cells.

FIG. 6a is a schematic, perspective illustration of a modular cell 250 of the present invention, having an encapsulated, conducting perimeter strip 260 for interconnecting with additional modular cells.

Figure 6B:
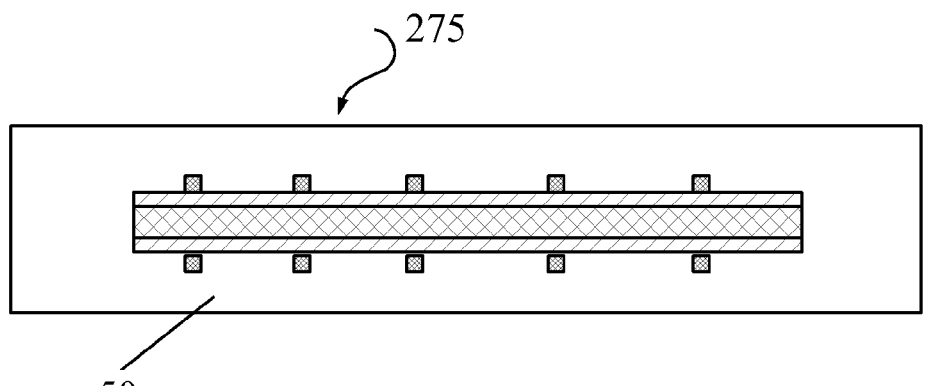
FIG. 6b is a schematic, cross-sectional view of a modular cell of the present invention, having a single, sealed cell wall encompassing the electrical components of the cell.

FIG. 6b is a schematic, cross-sectional view of a modular cell 275 of the present invention, having a single, sealed cell wall 50 encompassing the electrical components of cell 275. Sealed cell wall 50 is preferably made of plastic.

It should be emphasized that the present invention is applicable to all varieties of cell electrolytes, including liquid phase, gel, molten salt and solid phase types including ion exchange membranes.

In yet another aspect of the present invention, we assemble and seal cells either using an inert sealant (e.g., Suryln®), polytetrafluoroethylene, epoxy, or inorganic adhesive, or low temperature glass paste fireable at a temperature not exceeding the titania process temperature), or via battery technology using strips, gaskets or O-rings and the like (crimping-bolting or pressing-closed cell and module edges). In a preferred embodiment, a mechanism for providing periodic dye/electrolyte maintenance is included. In one preferred embodiment, the cell sealing wall is permanently fitted with at least one resealable fill tube or tap for maintenance purposes. In sharp contrast to dye cells and modules of the prior art, which are irreversibly sealed, the cells of the present invention can be maintained against dryout. This also enables cells and modules of the present invention to be assembled on a fast, automatic line that is more typical of a battery facility than a complex, cost and labor-intensive semiconductor plant.

Moreover, the above strategy for maintainable cell assembly, which, unlike irreversibly sealed cell assemblies, is maintainable with time and is designed to be periodically (e.g., every several years) accessible (enabling opening/resealing in field or in plant), with facility for dye/electrolyte top-up/replacement, as needed, can yield very long effective lifetimes of up to 25 years, rivaling the classical silicon solar cells. It must be emphasized that the dye cells of the prior art are notoriously prone to dryout and some designs become inoperative in only a few years, in full sunlight. The design and configuration of the cell of the present invention allow for a dye/electrolyte renewal process based mainly on simple liquid transfer type chemical operations such as removal/washout of residual cell dye/electrolyte, cell drying, and refilling with fresh dye/electrolyte. The replacement of other cell components in the battery type embodiment (e.g., with gasket or O-ring) is also possible under some designs (note that the titania and other components are very stable with time). A module gasket is a molded, pressed, or extruded component defining adjacently positioned, hydraulically independent and sealed (but electrically series-connectable) cell assemblies.

For slim cells (low weight, close spaced cell walls, minimum electrolyte and inter-electrode separation), positioning of gaskets in grooves at cell peripheries is an option.

Individual cells according to the present invention are the size of conventional photovoltaic cells (e.g. 100-200 square cm or more) with a thin, long rectangular strip form preferred for reduced ohmic drop. For example, an active cell area of 140 sq. cm (for example, 56 cm long by 2.5 cm wide) would provide about 2.1 Amps at peak solar illumination at 10% conversion efficiency. Only about 10% of the area is taken up by strips (5%) and seals (5%), and the current takeoff from cell edges does not take up precious area on the cell surface. Consequently, the geometric cell area is 155 square cm. A large module of 1 square meter active area could be built, by way of example, with 65 of these cells in series, providing at peak, 39V and 82 watts and attaining a reasonable conversion efficiency (about 8%) on the basis of the actual panel area. The cell/module edges may be sealed closed using sealants, or are pressed closed onto gaskets or O-rings by reinforcing edgings (e.g. metals such as copper, aluminum) held in place by crimping, bolts, clips or other suitable means, and each cell can carry fill tubes or taps. The cells/module thus are easily accessible for maintenance, and, when equipped with a gasket or O-ring, enable all the cells to be simultaneously exposed for dye/electrolyte renewal when the module cover (glass or plastic) is removed. Cells need not necessarily be opened for dye/electrolyte renewal, but could be accessed via the fill tubes (as in FIG. 3a). Although the design allows for direct injection of dye/electrolyte through the seal material via a syringe needle, e.g., via an elastomeric seal such as a gasket (FIG. 7), this does not assure good resealing. Mechanical support across the module face, if needed, can be provided by bolts passing through the gasket in the interior area of the module, or from support struts, etc., traversing the face of the module.

By way of example, FIG. 7 shows a gasket 162 for sealing a photovoltaic cell 300, and a crimp closure 164 at each end of photovoltaic cell 300, for pressuring gasket 162 so as to effect the sealing. Current takeoff from photovoltaic cell 300 is achieved using perimeter current takeoff strips 166a, 166b.

Since some aspects of the present invention allow the construction of plastic cells, we can, in addition to glass-walled cells, build sealed-for-life, flexible, low cost plastic cells, using molded or extruded components and plastic sealing technology (heat, vibration or ultrasonic welding). Such cells would be non-maintained and have a characteristically-reduced lifetime (7-10 years) relative to maintainable glass cells of the present invention. Longer-life, maintainable plastic cells could be fitted with a resealable fill tube or tap for dye/electrolyte replacement, or have means allowing for seal breakage, maintenance and resealing. Of course, plastic cells can also be built like glass cells with gasketing, as described hereinabove, allowing periodic opening/resealing for maintenance. One embodiment for either approach, shown schematically in FIG. 8, is to insert individual cells into a sheet plastic honeycomb support structure 350 and join cells 400 simultaneously electrically in series using a single side-mounted cover 420 fitted with mechanical contacts 422 such as spring clips or pin and socket and the like. This lightweight assembly allows periodic maintenance of cells by dye/electrolyte replacement, double protection against the elements, and removal and replacement of faulty cells in a series array of cells. This is an alternative construction to state-of-the-art thin film solar modules, in which the photoactive materials are evaporated onto a common conducting support, and in which case individual cell failure may mean irremediable module failure.

An additional aspect of the present invention takes advantage of the transparent or translucent nature of dye cells, a feature unique in photovoltaic technology. Dye cells are not opaque, like classic silicon or thin film cells, but assume the color of the dye and can be translucent. Various light transmitting colors are possible, with the most stable being wine colored, and the appearance is aesthetically attractive. Color matching is possible with building components (e.g., roof tiles). Cells and modules can be used in roofs, walls, windows, glass curtain walls of buildings and on atriums, stairways and covered areas (walkways, parking areas, etc.) allowing shade during the day and a pleasing diffuse light, as well as providing power. Such dye cell structures tend also to filter out the UV component in the transmitted light, which is a further benefit. The transmissivity of light through cells can be controlled by such factors as the titania type, the dye type and dye loading, and are also a function of incident light wavelength. Practical transmissivities for natural illumination needs are likely to be at least 50% and preferably at least 70%. Of course, the system can be designed with a tradeoff between power production needs and illumination needs. Such transparent/translucent dye cells and modules can also be mounted in place of the normal glass cover of solar water heaters (i.e., a few centimeters above and parallel to the selective absorber panel). A portion of the incident light is converted to electricity at up to 10% conversion, but depending on the dye, much of the remaining light energy can pass through the cell, enabling the remaining light energy to be absorbed by the selective absorber plate of the device, thereby providing also thermal energy for water heating (or air space heating). For example, and as shown schematically in FIG.

9a, a cell module 500 of the present invention is mounted on the face of solar water heater 440, so as to provide electricity as well as hot water from the same basic supporting structural unit and collector area.

It must be emphasized that there is no direct contact between the dye cells and the selective surface/water pipes of the collector, such that corrosion and shorts are avoided. The dye and selective coating can also be independently optimized to maximize absorption in the blue and red ends of the spectrum, respectively. As illustrated in FIG. 9b, dye cells 600 can be fitted onto a tracking or focusing-type solar collector 540 (e.g., trough or dish type), provided that the presence of cells 600 does not unacceptably reduce transmitted light or distort the optics. (The cells can alternatively be disposed in panel form across the outer edges of the trough or dish, essentially above the collector focus.) This integrated solar system enables direct generation of electricity without the need for a turbine. The remaining solar energy, after passage through the dye cell, focuses onto the usual receiver pipe 560 filled with heat transfer fluid, providing heat generation, for, by way of example, the provision of steam and hot water for industrial use, space heating, absorption cooling, or seawater desalination using multiple-effect distillation. The system can be designed with a tradeoff between electrical output and thermal output.

Figure 10A:
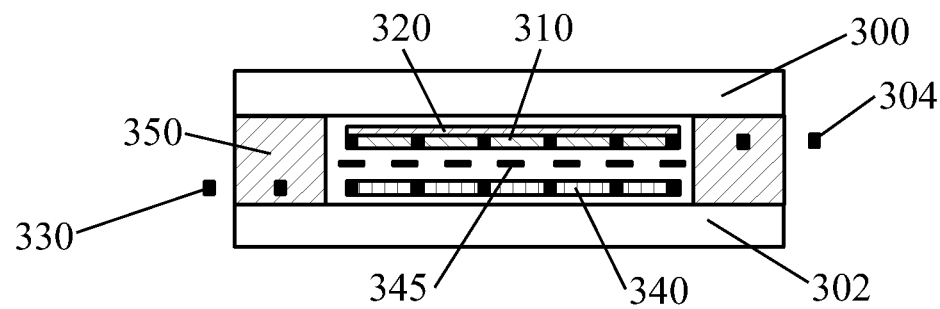
FIGS. 10a-10c are schematic diagrams showing the construction of a dye cell containing an electrically-conducting element made of a conductive mesh.

FIG. 10A is a schematic diagram showing the construction of a dye cell that does not require the use of tin oxide coated glass or plastic. The cell has a plain glass or plastic upper wall 300 (i.e., the direction facing the sun), and lower wall 302. The photoanode is an open conducting mesh of titanium 304, part of which is coated with a titania layer 310. The titania layer, which can be prepared at elevated temperatures, is overcoated with a conductive transparent layer of tin oxide 320 by spray, dip, sol gel, vacuum or plasma means. The counter-electrode is a similar conducting mesh of titanium 330, part of which is coated with a catalyst layer 340 for the iodine redox reaction, for example graphite powder bonded with a Teflon® binder. The cell also includes a porous separator 345 situated between the two meshes 304 and 330. Meshes 304 and 330 pass sealably through a cell perimeter seal 350, which can be of organic or inorganic types, and enable current takeoff outside the cell. The seal 350 can also include a resealable electrolyte fill tube (not shown). The cell is completed by introducing dye into the titania layer and filling with the redox electrolyte. If necessary, the titania layer can overcoat mesh 304.

Figure 10B:
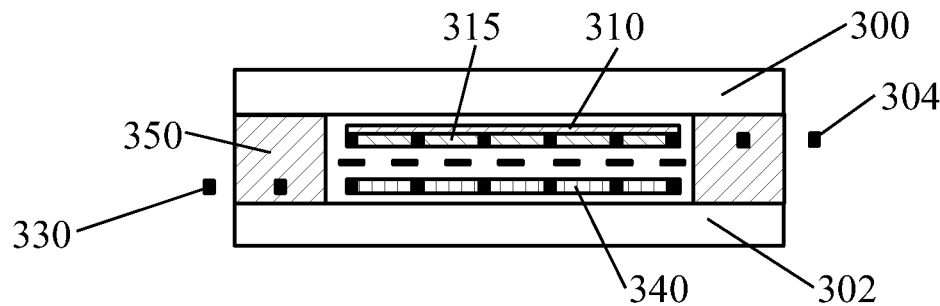

A slight modification of the above construction is shown in FIG. 10B. Titania layer 310 in mesh 304 is now uppermost and has an inert conductive underlayer 315 in intimate contact therewith. In such a case, titania layer 320 can bond directly to the glass if required. Underlayer 315 includes a material that is electro-catalytically inert to the iodine redox reaction in the cell, and can be fabricated from an inert conductive ceramic powder (e.g., titanium nitride, tin oxide or magneli oxide powder) bonded by an inert polymer binder such as polytetrafluoroethylene (Teflon®). If required, the titanium mesh itself can be coated with one of these materials to further reduce its activity.

Figure 10C:
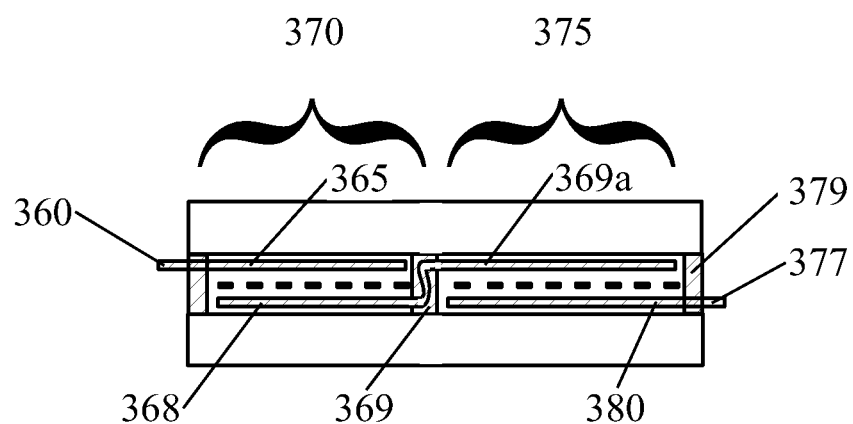

FIG. 10C shows two cells in series indicating the facile interconnection means. Mesh 360, emerging from one cell, is the negative terminal of a cell 370 and supports a titania layer 365 in the cell. Mesh 368 supports catalyst in cell 370 and sealably passes through a seal 369, where it supports a new titania layer 369A in a second cell 375. Mesh 377 emerging from cell 375 via a seal 379 is the positive terminal of the two-cell construction and supports a catalyst layer 380. It must be emphasized that no external connectors are needed and that both cells present a titania electrode to the sun.

As used herein and in the claims section that follows, the term "low-temperature glass" and the like refer to glass that is designed to seal up to the temperature at which titania is processed.

As used herein and in the claims section that follows, the terms "side" and "side wall", with reference to a photovoltaic cell, refer to a cell wall other than the cell wall that receives the light from the light source of the cell. The side wall may be a seal that seals the cell from the side, substantially normal to the light emitted by the light source.

As used herein in the specification and in the claims section that follows, the term "micron" refers to a micrometer.

As used herein in the specification and in the claims section that follows, the term "percent", or "%", refers to percent by weight, unless specifically indicated otherwise.

Similarly, the term "ratio", as used herein in the specification and in the claims section that follows, refers to a weight ratio, unless specifically indicated otherwise.

As used herein in the specification and in the claims section that follows, the term "largely includes" or "based on", with respect to a component within a formulation or alloy, refers to a weight content of at least at least 30%, at least 40%, at least 50%, or at least 60% of that component.

As used herein in the specification and in the claims section that follows, the term "predominantly includes", with respect to a component within a formulation, refers to a weight content of at least at least 50%, at least 65%, at least 75%, or at least 85% of that component.

Throughout this disclosure, various aspects of this invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 10 should be considered to have specifically disclosed subranges such as from 1 to 2, from 1 to 5, from 1 to 8, from 3 to 4, from 3 to 8, from 3 to 10, etc., as well as individual numbers within that range, for example, 1, 2, 3, 4, 5, 6, 7, 8, 9, and 10. This applies regardless of the breadth of the range.

Similarly, the terms "at least", "exceeds", and the like, followed by a number (including a percent or fraction), should be considered to have specifically disclosed all the possible subranges above that number, as well as individual numerical values above that number. For example, the term "at least 75" should be considered to have specifically disclosed subranges such as 80 and above, 90 and above, etc, as well as individual numbers such as 85 and 95.

Similarly, the terms "less than", "below", and the like, followed by a number (including a percent, fraction, or ratio such as a weight ratio), should be considered to have specifically disclosed all the possible subranges below that number, as well as individual numerical values below that number. For example, the term "below 75%" should be considered to have specifically disclosed subranges such as 70% and below, 60% and below, etc, as well as individual numbers such as 65% and 50%.

Whenever a numerical range is indicated herein, the range is meant to include any cited numeral (fractional or integral) within the indicated range. The phrase "ranging/ranges between" a first number and a second number and "within a range of" a first number to a second number, and the like, are used herein interchangeably and are meant to include the first and second indicated numbers and all the fractional and integral numerals therebetween.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A photovoltaic dye cell for converting a light source into an electrical current, the photovoltaic cell comprising:
   (a) a housing for the photovoltaic cell, said housing including an at least partially transparent cell wall, said cell wall having a first interior surface and a second interior surface;
   (b) an electrolyte, disposed within said cell wall, between said first and second interior surfaces;
   (c) an at least partially transparent, first electrically conductive coating, disposed on said first interior surface, within the photovoltaic cell;
   (d) an at least partially transparent, second electrically conductive coating, disposed on said second interior surface, within the photovoltaic cell;
   (e) an anode disposed on said first electrically conductive coating, said anode including:
      (i) a porous film, and
      (ii) a dye, absorbed on a surface of said porous film, said dye, said electrolyte, and said porous film adapted to convert photons to electrons;
   (f) a cathode disposed within said housing, said cathode disposed substantially opposite said anode, said cathode disposed on said second electrically conductive coating;
   (g) a first plurality of electrically-conductive metallic wires, disposed at least partially within the photovoltaic cell, said first plurality of electrically-conductive metallic wires electrically contacting said anode and said first electrically conductive coating;
   (h) a second plurality of electrically-conductive metallic wires, disposed at least partially within the photovoltaic cell, said second plurality of electrically-conductive metallic wires electrically contacting said cathode and said second electrically conductive coating;
   (i) a current collection element, electrically connected to each of said first and second pluralities of electrically-conductive metallic wires, and configured to remove, via said first and second pluralities of electrically-conductive metallic wires, the current produced by the photovoltaic cell;
   (j) a first plurality of grooves being disposed in said first interior surface of said cell wall, a contiguity of said first electrically conductive coating being interrupted by said first plurality of grooves, each of said first plurality of grooves at least partially containing a wire of said first plurality of electrically-conductive metallic wires; and
   (k) a second plurality of grooves being disposed in said second interior surface of said cell wall, each of said second plurality of grooves at least partially containing a wire of said second plurality of electrically-conductive metallic wires.

2. The photovoltaic cell of claim 1, said electrolyte containing a redox species.

3. The photovoltaic cell of claim 2, wherein at least one of said first plurality of electrically-conductive metallic wires is fully disposed within a groove of said first plurality of grooves.

4. The photovoltaic cell of claim 1, at least one of said second plurality of electrically-conductive metallic wires being fully disposed within a groove of said second plurality of grooves.

5. The photovoltaic cell of claim 3, at least one of said second plurality of electrically-conductive metallic wires being fully disposed within a groove of said second plurality of grooves.

6. The photovoltaic cell of claim 1, further comprising a third electrically conductive coating including an inorganic binder and an inorganic electrically conductive filler, at least partially disposed within at least one groove of said first plurality of grooves, said third coating bridging between and electrically communicating between each of said first plurality of electrically-conductive metallic wires and said first electrically conductive coating.

7. The photovoltaic cell of claim 1, said porous film containing titania.

8. The photovoltaic cell of claim 1, said porous film baked on to said first electrically conductive coating.

9. The photovoltaic cell of claim 2, said redox species including an iodine-based redox species.

10. The photovoltaic cell of claim 1, wherein, in each of said second plurality of grooves, said second electrically conductive coating encapsulates a wire of said second plurality of electrically-conductive metallic wires.

11. The photovoltaic cell of claim 6, said inorganic electrically conductive filler being selected from the group consisting of metal powders, metal oxides, metal carbides, metal borides, metal silicides, and metal nitrides.

12. The photovoltaic cell of claim 6, wherein said inorganic electrically-conductive filler includes titanium nitride.

13. The photovoltaic cell of claim 1, said cathode including an electrically conductive structure having a catalytic surface facing said anode.

14. The photovoltaic cell of claim 13, said electrically conductive structure of said cathode including an electrically conducting porous mat.

15. The photovoltaic cell of claim 14, said electrically conducting porous mat including a carbon fiber veil.

16. The photovoltaic cell of claim 14, said electrically conducting porous mat including a titanium mesh.

17. The photovoltaic cell of claim 14, said electrically conducting porous mat including a coating including carbon or graphite.

18. The photovoltaic cell of claim 1, said cathode including a catalyst coating supported on carbon or graphite.

* * * * *